United States Patent [19]

Tanaka

[11] Patent Number: 5,780,725

[45] Date of Patent: Jul. 14, 1998

[54] METHOD OF ESTIMATING SERVICE LIFE OF CUTTER

[75] Inventor: Kunio Tanaka, Akishima, Japan

[73] Assignee: Fanuc, Ltd., Yamanashi, Japan

[21] Appl. No.: 802,851

[22] Filed: Feb. 19, 1997

Related U.S. Application Data

[60] Continuation of Ser. No. 593,279, Jan. 29, 1996, abandoned, which is a division of Ser. No. 403,771, Mar. 24, 1995, Pat. No. 5,571,957.

[30] Foreign Application Priority Data

Aug. 9, 1993 [JP] Japan ............................ 5-197119

[51] Int. Cl.$^6$ .................................................. G01N 3/58
[52] U.S. Cl. .................................................. 73/104
[58] Field of Search ................... 73/104; 83/522.11, 83/522.12, 522.27; 340/680

[56] References Cited

U.S. PATENT DOCUMENTS

| | | |
|---|---|---|
| 3,545,310 | 12/1970 | Porath et al. |
| 3,809,870 | 5/1974 | Auble et al. ........................ 73/104 |
| 4,564,910 | 1/1986 | Smith et al. ........................ 73/104 |
| 4,694,686 | 9/1987 | Fildes et al. ........................ 73/104 |

FOREIGN PATENT DOCUMENTS

| | | |
|---|---|---|
| 62-287959 | 12/1987 | Japan. |
| 64-34639 | 2/1989 | Japan. |
| 3-110606 | 5/1991 | Japan. |
| 3-176752 | 8/1991 | Japan. |
| 4-300145 | 10/1992 | Japan. |
| 4-310351 | 11/1992 | Japan. |
| 5-9851 | 2/1993 | Japan. |

Primary Examiner—Robert Raevis

[57] ABSTRACT

The service life of a cutter is determined with high accuracy by determining a corrective coefficient from a material coefficient determined by a material to be machined by the cutter and a machining condition coefficient determined by machining conditions, multiplying a period of usage of the cutter by said corrective coefficient thereby to correct the period of usage, accumulating corrected periods of usage, and judging the cutter as having ended its service life if the accumulated value exceeds a predetermined reference value.

3 Claims, 8 Drawing Sheets

| MATERIAL TO BE MACHINED | MATERIAL COEFFICIENT |
|---|---|
| CAST IRON | 1.00 |
| CARBON STEEL | 2.22 |
| BESSEMER STEEL | 1.42 |
| MANGANESE STEEL | 1.45 |
| NICKEL-CHROMIUM STEEL | 1.55 |
| CHROMIUM-MOLYBDENUM STEEL | 1.62 |
| NICKEL-MOLYBDENUM STEEL | 2.12 |
| CHROMIUM STEEL | 2.46 |
| CHROMIUM-VANADIUM STEEL | 2.08 |

METHOD OF ESTIMATING SERVICE LIFE OF CUTTER

This application is a continuation of application Ser. No. 08/593,279, filed Jan. 29, 1996, now abandoned, which is a division of application Ser. No. 08/403,771, filed Mar. 24,1995, now U.S. Pat. No. 5,571,957.

TECHNICAL FIELD

The present invention relates to a method of estimating the service life of a cutter, and more particularly to a method of estimating the service life of a cutter for automatically changing cutters in a numerically controlled machine tool.

BACKGROUND ART

Unmanned operation of a numerically controlled machine tool for a long period of time requires that the service life of a cutter be supervised precisely. If the cutter is used beyond its service life, it may often be broken. When the cutter in the form of a drill bit is broken, the broken drill bit remains stuck in a workpiece, making the workpiece useless. However, it is uneconomical to estimate the service life of a cutter to be too short. On the other hand, estimating the service life of a cutter to be longer than necessary tends to fracture the cutter when in use. Therefore, it is necessary to recognize the service life of a cutter exactly and replace the cutter before the service life expires.

It has been customary to count how many times a cutter has been used or accumulate periods of time in which it has been used, and to judge the cutter as reaching the end of its service life when the count or the accumulated periods of time exceed a predetermined reference value. According to an alternative procedure, the load current of a spindle motor coupled to a cutter is monitored, and the service life of the cutter is determined as having expired when the absolute value of the load current exceeds a predetermined reference value.

However, the above conventional processes are too simple to take into account any factors involved in an actual cutting process as affecting the service life of a cutter, and apply the same calculating procedure to the estimation of the service life of a cutter which has cut workpieces under a light load and the estimation of the service life of a cutter which has cut workpieces under a heavy load. The process of monitoring the load current of a spindle motor is disadvantageous in that widely different reference values are employed for different cutter types or machining conditions and make the entire process complex.

DISCLOSURE OF THE INVENTION

In view of the aforesaid problems, it is an object of the present invention to provide a method of estimating the service life of a cutter with very high accuracy.

To achieve the above object, there is provided in accordance with a first aspect of the present invention a method of estimating the service life of a cutter, comprising the steps of determining a corrective coefficient from a material coefficient determined by a material to be machined by the cutter and a machining condition coefficient determined by machining conditions, multiplying a period of usage of the cutter by the corrective coefficient thereby to correct the period of usage, and accumulating corrected periods of usage thereby to estimate the service life of the cutter with the accumulated corrected periods.

According to a second aspect of the present invention, there is provided a method of estimating the service life of a cutter, comprising the steps of determining a disturbant load torque imposed on the cutter with an observer, and integrating determined disturbant load torques thereby to estimate the service life of the cutter with the integrated disturbant load torques.

According to a third aspect of the present invention, there is provided a method of estimating the service life of a cutter, comprising the steps of determining a disturbant load torque imposed on the cutter with an observer, and determining a rate of change of the determined disturbant load torque thereby to estimate the service life of the cutter with the determined rate of change.

In the first aspect, a corrective coefficient, depending on the material of a workpiece to be machined and machining conditions for a cutter, is introduced to apply a load that is actually imposed on the cutter to the estimation of the service life of the cutter. Therefore, the service life of the cutter can be estimated highly accurately.

In the second aspect, disturbant load torques (cutting loads) which are actually exerted solely to a cutter are integrated to make it possible to estimate the service life of the cutter with high accuracy in a manner to match the loaded state of the cutter.

In the third aspect, a rate of change of a disturbant load torque (cutting load) on a cutter is detected, and the magnitude of the rate of change is detected when the wear of the cutter increases and its cutting capability is lowered. Therefore, it is possible to specifically detect a time at which the machining capability of the cutter starts being lowered.

BRIEF DESCRIPTION OF THE DRAWINGS

FIG. 2 is a map table of material coefficients used in the method;

DESCRIPTION OF THE PREFERRED EMBODIMENTS

An embodiment of the present invention will hereinafter be described below with reference to the drawings.

Figure 1:
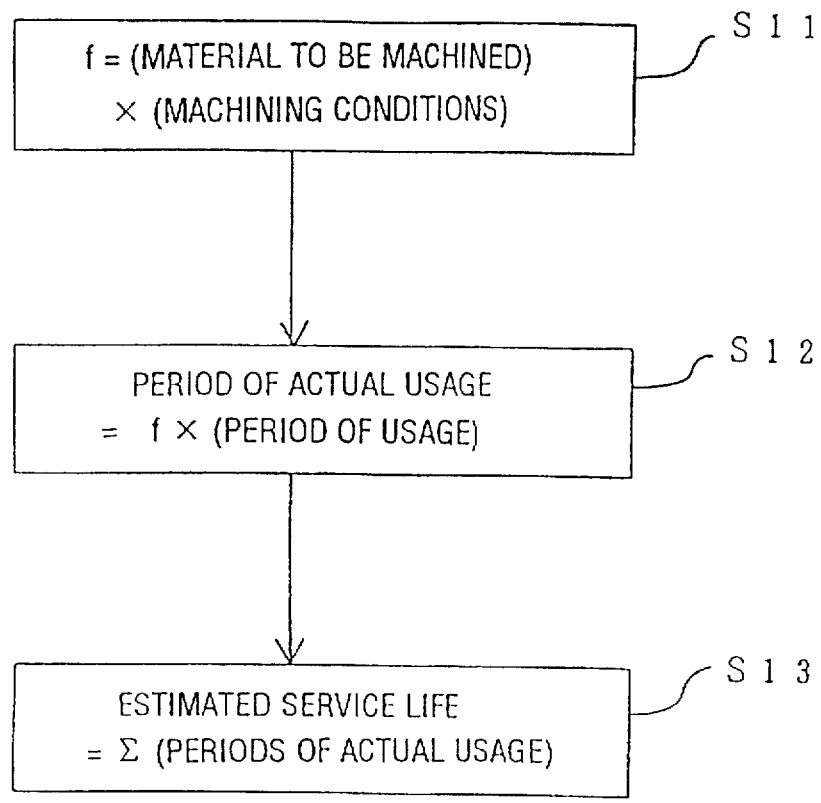
FIG. 1 is a flowchart of a method of estimating the service life of a cutter according to a first embodiment of the present invention.

FIG. 1 is a flowchart of a method of estimating the service life of a cutter according to a first embodiment of the present invention. Numerals following the letter "S" in FIG. 1 represent step numbers.

[S11] First, a material coefficient determined by a material to be machined is used as reference data and multiplied by a machining condition coefficient determined by the feed rate of a cutter and the rotational speed of a spindle coupled thereto, thus determining a corrective coefficient f for each machining cycle.

[S12] Then, the period of usage of the cutter in the machining process is corrected by being multiplied by the corrective coefficient f, into a period of usage determined with the actual machining state taken into account.

[S13] Corrected periods of usage are accumulated to estimate the service life of the cutter, and the service life thus estimated for each cutter is used as supervisory data for service life supervision in a computerized numerical control apparatus.

The service life of a cutter widely differs depending on the material of a workpiece machined thereby, the feed rate of the cutter, and the rotational speed of the spindle coupled to the cutter even if the cutting time remains the same. Therefore, coefficients determined depending on the material of a workpiece machined thereby, the feed rate of the cutter, and the rotational speed of the spindle coupled to the cutter are made available for each machining cycle, and applied to the period of usage for which the cutter has actually machined the workpiece.

A corrective coefficient f applied to a period of usage is determined using a material coefficient which is determined depending on the material to be machined as reference data for each machining cycle. Material coefficients are separately stored in a map table.

FIG. 2 is a map table of material coefficients. As shown in FIG. 2, the map table stores materials to be machined and material coefficients which correspond to the materials to be machined. The material coefficient is of a greater value as the material to be machined has greater hardness, and a smaller value as the material to be machined has smaller hardness.

The corrective coefficient f is also determined using a machining condition coefficient which is determined as additional data that take into account machining conditions including the feed rate of the cutter and the rotational speed of the spindle coupled to the cutter, the machining condition coefficient being used to modify the material coefficient which has previously been determined. The machining condition coefficient generally depends on the feed rate of the cutter and the rotational speed of the spindle coupled to the cutter. Specifically, the corrective coefficient f is determined according to the equation:

Corrective coefficient $f$=(Material coefficient)×(Machining condition coefficient).

The corrective coefficient f is then applied to the period of usage of the cutter, thus determining a period of usage based on the actual machining cycle. The actual period of usage is determined according to the equation:

Actual period of usage=$f$×(Period of usage).

Actual periods of usage thus determined are accumulated for each cutter. The accumulated actual periods of usage serve as data estimating the service life of the cutter, and are used as supervisory data for supervising the service life of the cutter. Therefore, a computerized numerical control apparatus, which automatically determines a machining time, can increase the accuracy of an estimated service life by generating the corrective coefficient f.

A process of supervising the service life of a cutter used in cutting cycles, to which the method of estimating the service life of a cutter using a corrective coefficient is applied, will be described below.

Figure 3:
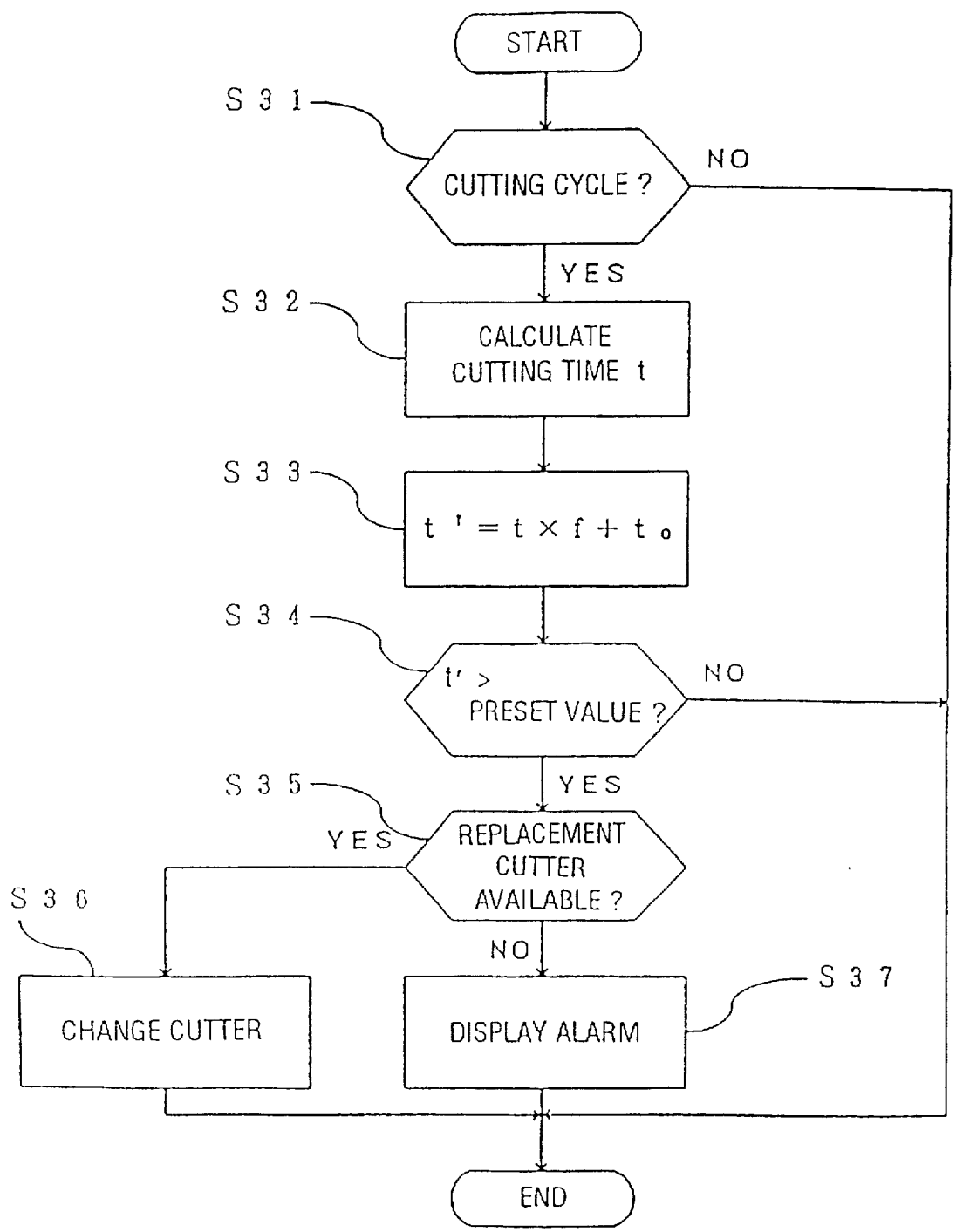
FIG. 3 is a flowchart of a process of supervising the service life of a cutter.

FIG. 3 is a flowchart of such a process of supervising the service life of a cutter. Numerals following the letter "S" in FIG. 3 represent step numbers.

[S31] It is determined whether a present program is directed to a cutting cycle or simply a positioning cycle. If the present program is directed to a cutting cycle, then control goes to a step S32. Otherwise, the process is ended.

[S32] A cutting time t is determined.

[S33] The cutting time t is multiplied by a corrective coefficient f to determine a cutting time with a machining state taken into account. To the cutting time thus determined, there is added an integrated time to stored in a memory and representing a cutter service life up to the preceding machining cycle, thereby producing an integrated time t' representing a cutter service life up to the present machining cycle.

[S34] The integrated time t' is compared with a preset value to determine whether the cutter service life has exceeded the preset value or not. If the cutter service life has exceeded the preset value, then control goes to a step S35. If not, then the process comes to an end.

[S35] It is determined whether there is available a replacement cutter not in use. If a replacement cutter is available, then control goes to a step S36. If not, then control goes to a step S37.

[S36] A tool change is commanded between the cutter whose service life has expired and a replacement cutter which is registered in the memory.

[S37] An alarm indicating that no replacement cutter is available is displayed on a display screen, for example.

Figure 4:
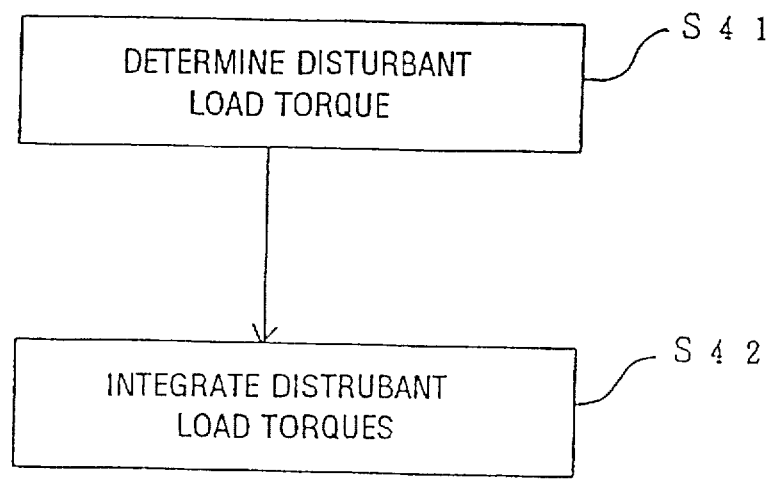
FIG. 4 is a flowchart of a method of estimating the service life of a cutter according to a second embodiment of the present invention.

FIG. 4 is a flowchart of a method of estimating the service life of a cutter according to a second embodiment of the present invention. Numerals following the letter "S" in FIG. 4 represent step numbers.

[S41] First, a disturbant load torque applied directly to a cutter is determined by an observer in a spindle control circuit.

[S42] Then, disturbant load torques determined by the observer are integrated in a determined sampling time into an integrated value, which is used as data for estimating the service life of a cutter. If the integrated value exceeds a certain reference value, then the service life of the cutter is judged as having expired, and a process of issuing an alarm or the like is carried out.

The observer is included in the spindle control circuit for controlling the spindle that is connected to the cutter, and serves to monitor the load current of a spindle motor which is controlled by the spindle control circuit to rotate the spindle. The observer can obtain, as an estimated value, a disturbant load torque (disturbant load current value) produced by subtracting an acceleration/deceleration torque from the output torque of the spindle motor. The disturbant load torque is composed of only a torque component imposed solely on the cutter, and may be interpreted as damage itself inflicted upon the cutter. Since the disturbant load torque obtained by the observer constitutes data indicative exactly of the state in which the cutter is used, the disturbant load torque can be used as basic data for calculating the service life of the cutter. Therefore, the service life of the cutter can be estimated highly accurately using the disturbant load torque. Details of an observer for determining a disturbant load torque are disclosed in Japanese laid-open patent publication No. 3-196313 filed by the present applicant.

Disturbant load torques are simply integrated in a determined sampling time as service life data. The integrated value which represents the actual wear of the cutter is compared with a reference value indicative of the service life of the cutter used. If the integrated value is in excess of the reference value, then it is used for cutter replacement or the like.

Figure 5:
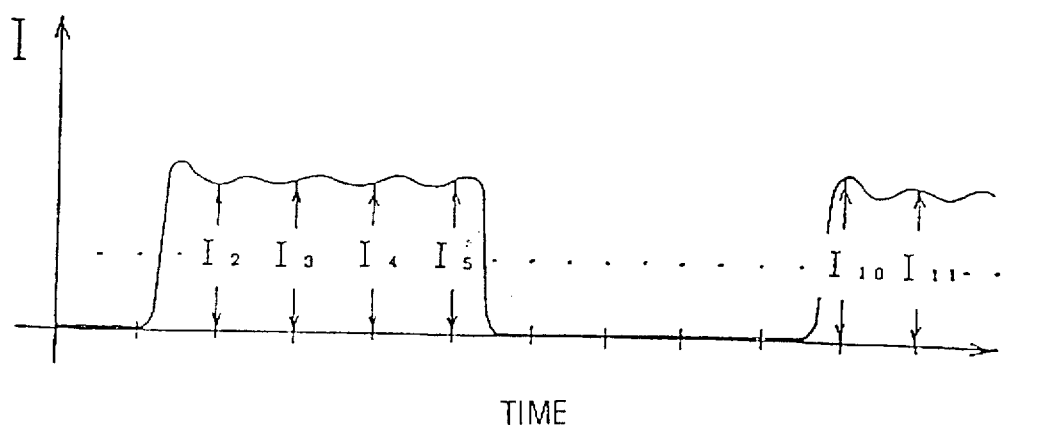
FIG. 5 is a diagram showing a process of integrating disturbant load torques.

FIG. 5 is a diagram showing a process of integrating disturbant load torques. In FIG. 5, the vertical axis represents a disturbant load current I corresponding to a disturbant load torque, and the horizontal axis represents time. As shown in FIG. 5, disturbant load torques are integrated by sampling the disturbant load current I at constant intervals and successively integrating current values I. The integrated value is thus determined according to the following equation:

$$\text{Integrated value} = I_o + I_1 + I_2 + I_3 + \ldots I_n.$$

Another process of integrating disturbant load torques is to calculate integrated data based on PID Proportion-Integration-Differential control. According to this process, a value produced by integrating the disturbant load current I indicative of the disturbant load torque in FIG. 5 can be obtained, so that the integrated value of disturbant load torques can be calculated accurately.

Figure 6:
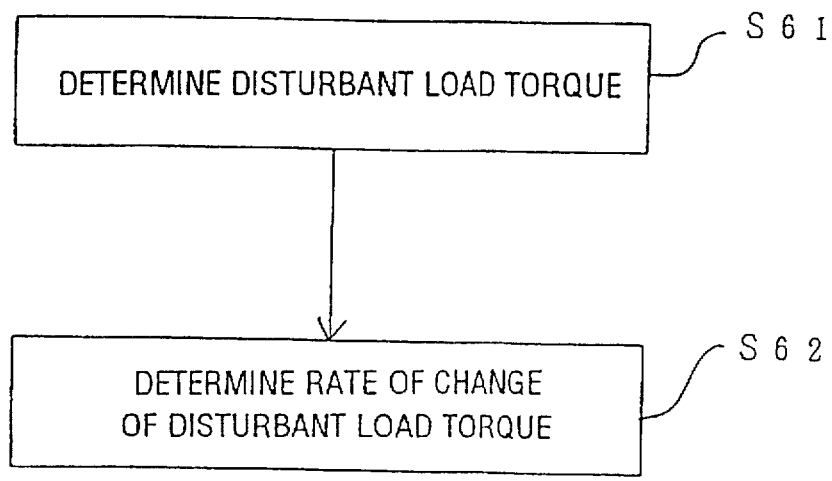
FIG. 6 is a flowchart of a method of estimating the service life of a cutter according to a third embodiment of the present invention.

FIG. 6 is a flowchart of a method of estimating the service life of a cutter according to a third embodiment of the present invention. Numerals following the letter "S" in FIG. 6 represent step numbers.

[S61] First, a disturbant load torque applied directly to the cutter is determined by an observer in a spindle control circuit.

[S62] Then, a rate of change of the disturbant load torque determined by the observer is determined. The determined rate of change is compared with a preset maximum allowable rate of change for a present cutter or each machining cycle. If the determined rate of change is larger than the preset maximum allowable rate of change, then the service life of the cutter is estimated to have expired.

As the cutter is worn, variations of the disturbant load torque applied in a cutting cycle become larger than when the cutter is normal. Specifically, if the cutter is in the form of a drill bit, as it goes through machining cycles, the drill bit becomes blunt and suffers a greater torsional force applied thereto. Since the drill bit is unable to cut a workpiece unless supplied with a greater torque, the disturbant load torque detected by the observer becomes progressively greater. Therefore, the rate of change of the detected disturbant load torque sharply increases as the service life of the drill bit approaches its end. Consequently, the service life of the drill bit can be estimated by monitoring the rate of change of the disturbant load torque, and the drill bit can be replaced before it is broken or can no longer perform the intended drilling operation.

Figure 7:
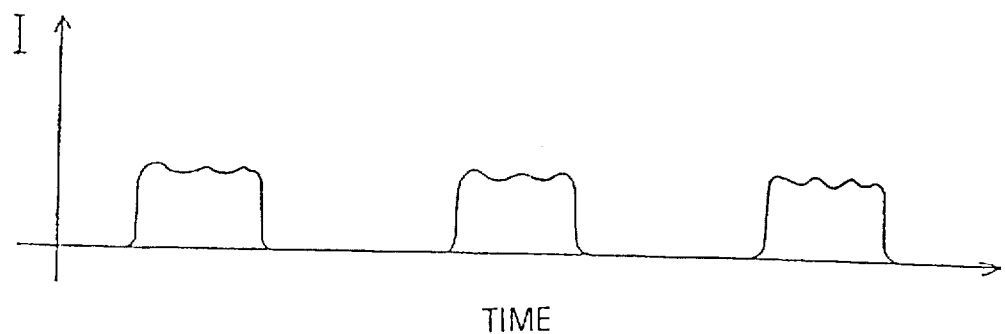
FIGS. 7(A) and 7(B) are diagrams illustrative of a procedure for estimating the wear of a cutter based on a rate of change of load.
Figure 7:
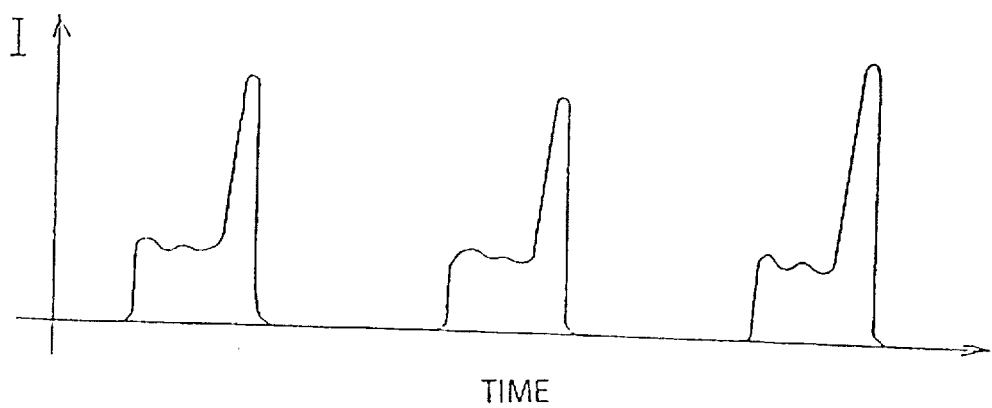

FIGS. 7(A) and 7(B) are diagrams illustrative of a procedure for estimating the wear of a cutter based on a rate of change of load. In each of FIGS. 7(A) and 7(B), the vertical axis represents a disturbant load current I equivalent to a disturbant load torque, and the horizontal axis represents time.

FIG. 7(A) illustrates the manner in which the disturbant load torque, i.e., the disturbant load current I, varies at the time the cutter normally cuts a workpiece before it is worn. As shown in FIG. 7(A), the disturbant load current I does not vary greatly when the cutter is normal. However, as the cutter is worn, the disturbant load current I sharply increases in certain time regions in machining cycles as shown in FIG. 7(B). When the rate of increase of the disturbant load current I exceeds a certain level, i.e., when the rate of change of the disturbant load torque exceeds a certain preset value, the cutter is estimated to have ended its service life.

Each of the above methods of estimating the service life of a cutter is usually employed singly in the process of supervising the service life of a cutter in the computerized numerical control apparatus. However, two or more of the methods of estimating the service life of a cutter may be combined in some cases.

Figure 8:
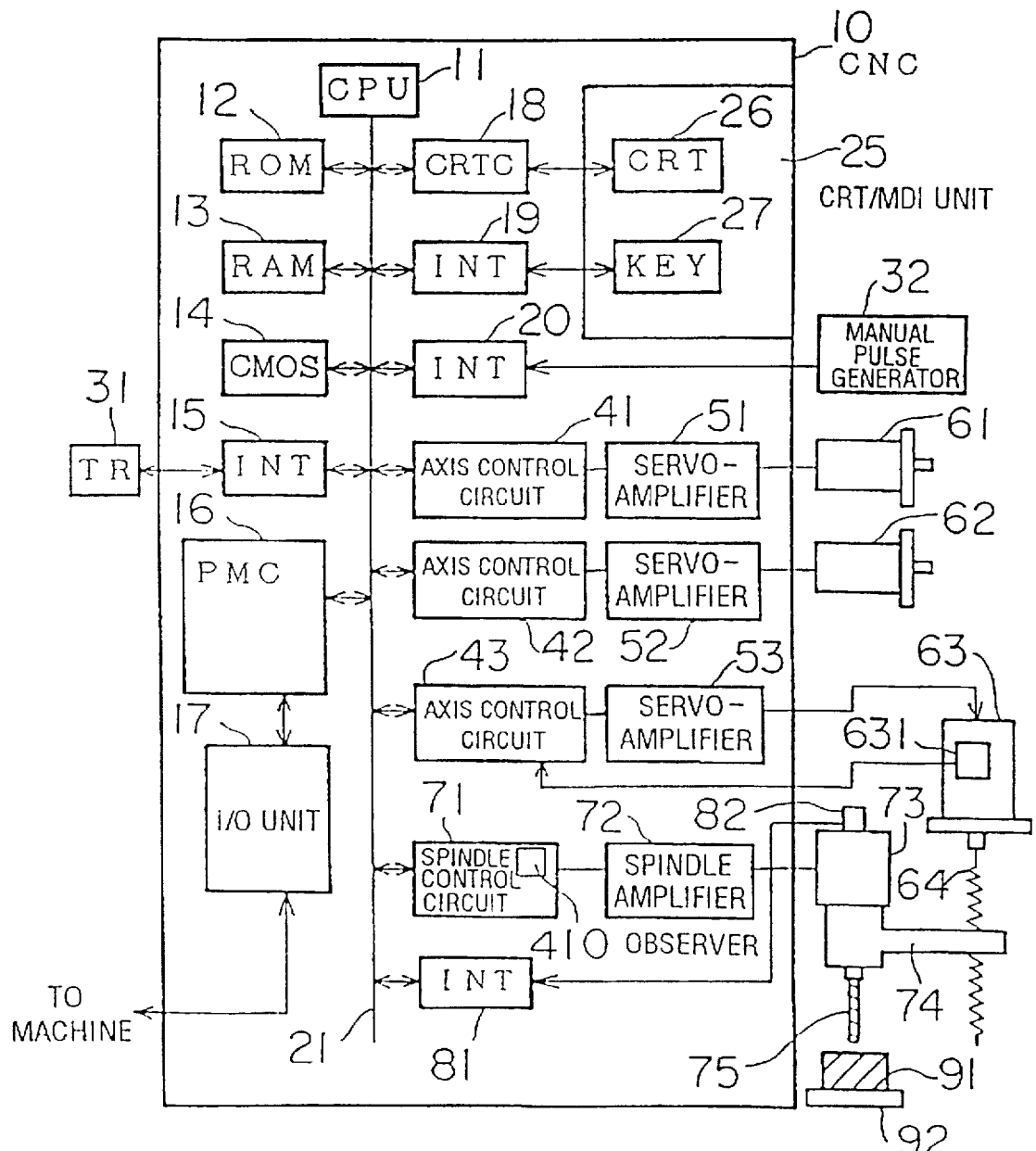
FIG. 8 is a block diagram of a hardware arrangement of a computerized numerical control (CNC) apparatus for carrying out a method of estimating the service life of a cutter according to the present invention

FIG. 8 shows in block form a hardware arrangement of a computerized numerical control (CNC) apparatus which carries out a method of estimating the service life of a cutter according to the present invention. As shown in FIG. 8, the computerized numerical control (CNC) apparatus is indicated by the reference numeral 10. The computerized numerical control apparatus 10 has a central processor (CPU) 11 for controlling the computerized numerical control apparatus 10 in its entirety. The central processor 11 reads a system program stored in a read-only memory (ROM) 12 through a bus 21, and executes control over the computerized numerical control apparatus 10 in its entirety according to the system program. A random-access memory (RAM) 13 stores temporary calculated data and display data. The random-access memory 13 comprises a DRAM or the like. A nonvolatile memory (CMOS) 14 stores a machining program, various parameters, integrated times, and integrated disturbant load torques. The nonvolatile memory 14 is backed up by a battery (not shown), so that the stored data will be retained in the event of a power failure of the computerized numerical control apparatus 10.

An interface (INT) 15 serves to interface the computerized numerical control apparatus 10 with an external device 31 which may be a tape reader, a tape puncher, or a tape reader/puncher. A machining program can be read from the external device 31 which comprises a tape reader through the interface 15, and a machining program edited in the computerized numerical control apparatus 10 can be outputted to the external device 31 which comprises a tape puncher through the interface 15.

A programmable machine controller (PMC) 16 is provided in the computerized numerical control apparatus 10 for controlling a machine tool according to a sequence program which is generated in ladder form. Specifically, the programmable machine controller 16 converts an M function (miscellaneous function), an S function (spindle function), and a T function (tool function) which are commanded by the machining program, into signals required by the machine tool according to the sequence program, and outputs the converted signals from an input/output (I/O) unit 17. The outputted signals are supplied to energize electromagnets on the machine tool and operate hydraulic valves, pneumatic valves, and electric actuators. The programmable machine controller 16 also processes signals from limit switches on the machine tool and switches on a machine control console, and delivers the processed signals to the processor 11.

A graphic control circuit (CRTC) 18 converts digital data including the present positions of the axes, alarms, parameters, and image data into image signals, which are sent to a display device (CRT) 26 of a CRT/MDI (Cathode-Ray Tube/Manual Data Input) unit 25, and displayed on the display device 26. An interface 19 receives data from a keyboard (KEY) 27 in the CRT/MDI unit 25, and delivers the received data to the processor 11.

An interface (INT) 20 is connected to a manual pulse generator 32 for receiving pulses generated by the manual pulse generator 32. The manual pulse generator 32 is mounted on the machine control console for manually positioning mechanical operable parts accurately.

Axis control circuits 41–43 receive motion commands for the respective axes from the processor 11, and outputs commands for the respective axes to servoamplifiers 51–53, respectively. In response to the commands, the servoamplifiers 51–53 energize respective servomotors 61–63 for the respective axes. The servomotor 63 which controls the feeding of a Z-axis rotates a ball screw 64 to control the position and feeding velocity of a spindle head 74 connected to a spindle motor 73 in the direction of the Z-axis. The servomotor 63 has a built-in pulse coder 631 for detecting the position of the spindle head 74. A positional signal from the pulse coder 631 is fed as a pulse train back to the axis control circuit 43. Although not shown, the servomotors 61, 62 which control the feeding of X- and Y-axes, respectively, have respective built-in pulse coders for positional detection. These pulse coders also feed positional signals as pulse trains back to the axis control circuits 41, 42. Linear scales may be used as such position detectors.

A spindle control circuit 71 receives a spindle rotation command and a spindle orientation command, and outputs a spindle velocity signal to a spindle amplifier 72. In response to the spindle velocity signal, the spindle amplifier 72 energizes the spindle motor 73 to rotate at a rotational velocity commanded by the spindle rotation command. The spindle amplifier 72 also positions the spindle at a position indicated by the spindle orientation command.

A position coder 82 is coupled to the spindle motor 73 through gears or a belt. The position coder 82 rotates in synchronism with the spindle motor 73, and outputs feedback pulses through an interface (INT) 81 to the processor 11 which reads the feedback pulses. The feedback pulses serve to move the other axes synchronously with the spindle motor 73 to make it possible to effect machining such as drilling. The feedback pulses may be converted into a velocity signal by way of F/V (frequency-to-velocity) conversion.

The spindle control circuit 71 has a processor (not shown) for executing software processing to perform functions, one of which is an observer 410. The observer 410 estimates a disturbant load torque imposed on the spindle motor 73 in response to the velocity signal. The disturbant load torque is sent to the processor 11, which reads the disturbant load torque and estimates the service life of a cutter.

A drill bit 75 is mounted on the spindle head 74 of the spindle motor 73. The rotation of the drill bit 75 is controlled by the spindle motor 73. The position and feeding velocity of the drill bit 75 in the direction of the Z-axis are controlled by the servomotor 63 through the spindle head 74.

The drill bit 75 is fed in the Z-axis direction by the servomotor 63 for drilling a workpiece 91. The workpiece 91 is fixedly mounted on a table 92 which is controlled to move in the X- and Y-axis directions by the respective X- and Y-axis servomotors 61, 62 through mechanisms, not shown.

According to the first embodiment, as described above, a corrective coefficient depending on machining conditions for a cutter is introduced to apply a load that is actually imposed on the cutter to the estimation of the service life of the cutter. Therefore, the service life of the cutter can be estimated highly accurately.

According to the second embodiment, as described above, disturbant load torques, which are exerted solely to a cutter, are integrated to make it possible to estimate the service life of the cutter with high accuracy in a manner to match the loaded state of the cutter.

According to the third embodiment, as described above, the service life of a cutter is estimated based on the magnitude of a rate of change of a disturbant load torque. Therefore, it is possible to specifically detect a time at which the machining capability of the cutter starts being lowered.

I claim:

1. A method of estimating the service life of a cutter, comprising the steps of:

determining disturbant load torques imposed on the cutter with an observer; and using the determined disturbant load torques thereby to estimate the service life of the cutter, wherein determined disturbant load torques are integrated thereby to estimate the service life of the cutter.

2. A method according to claim 1, wherein the integrated disturbant load torques are produced by integrating sampled data of the disturbant load torques.

3. A method according to claim 1, wherein the integrated disturbant load torques are calculated based on proportional plus integral plus derivative control of disturbant load torques.

* * * * *